(12) United States Patent
Kamei

(10) Patent No.: US 6,819,778 B2
(45) Date of Patent: Nov. 16, 2004

(54) METHOD AND SYSTEM FOR TRACKING A FAST MOVING OBJECT

(75) Inventor: Toshio Kamei, Tokyo (JP)

(73) Assignee: NEC Corporation, Tokyo (JP)

( * ) Notice: Subject to any disclaimer, the term of this patent is extended or adjusted under 35 U.S.C. 154(b) by 636 days.

(21) Appl. No.: 09/820,332

(22) Filed: Mar. 29, 2001

(65) Prior Publication Data

US 2001/0046309 A1 Nov. 29, 2001

(30) Foreign Application Priority Data

Mar. 30, 2000 (JP) ....................................... 2000-095375

(51) Int. Cl.$^7$ ................................................ G06K 9/00
(52) U.S. Cl. ....................................................... 382/103
(58) Field of Search .............................. 382/103, 107, 382/291; 348/155, 208.3, 208.4; 725/12; 396/153

(56) References Cited

U.S. PATENT DOCUMENTS

| | | | | |
|---|---|---|---|---|
| 5,923,365 A | * | 7/1999 | Tamir et al. | ................. 348/169 |
| 5,926,212 A | * | 7/1999 | Kondo | .................. 348/207.99 |
| 6,297,846 B1 | * | 10/2001 | Edanami | ..................... 348/239 |
| 6,335,985 B1 | * | 1/2002 | Sambonsugi et al. | ....... 382/190 |
| 6,349,113 B1 | * | 2/2002 | Mech et al. | ........... 375/240.08 |
| 6,643,387 B1 | * | 11/2003 | Sethuraman et al. | ........ 382/107 |
| 2003/0147462 A1 | * | 8/2003 | Maeda | ..................... 375/240.1 |

FOREIGN PATENT DOCUMENTS

| | | | | |
|---|---|---|---|---|
| JP | 10-13821 | 1/1998 | ............ | H04N/7/18 |
| JP | 10-79881 | 3/1998 | .......... | H04N/5/232 |
| JP | 10-91795 | 4/1998 | ............. | G06T/7/20 |
| JP | 11-69342 | 3/1999 | ............ | H04N/7/18 |

* cited by examiner

*Primary Examiner*—Andrew W. Johns
*Assistant Examiner*—Shervin Nakhjavan
(74) *Attorney, Agent, or Firm*—Foley & Lardner LLP

(57) ABSTRACT

A moving object is detected by subtraction between successive frames produced by a video camera and a position and a size of the moving object are determined. Preceding and succeeding frames produced by the video camera are stored into respective memories and the panning, tilting and zooming functions of the video camera are controlled according to the determined position and size of the moving object. A motion compensation is performed on the preceding frame to compensate for a motion of background image caused by a tracking movement of the camera so that coordinates of the motion-compensated frame are transformed to coordinates of the succeeding frame. An image difference between the motion-compensated frame and the succeeding frame is extracted as a moving object and a position and a size of the extracted image are determined, with which the video camera is adaptively controlled.

30 Claims, 7 Drawing Sheets

LEGEND: X, Y, Z = COORDINATES OF VIDEO CAMERA
x, y = COORDINATES OF IMAGE PLANE

| 1 | 1 | 2 | 1 | 1 |
|---|---|---|---|---|
| 1 | 2 | 4 | 2 | 1 |
| 2 | 4 | 8 | 4 | 2 |
| 1 | 2 | 4 | 2 | 1 |
| 1 | 1 | 2 | 1 | 1 |

METHOD AND SYSTEM FOR TRACKING A FAST MOVING OBJECT

BACKGROUND OF THE INVENTION

1. Field of the Invention

The present invention relates generally to digital image processing, and more specifically to a method and system for detecting a moving object in a monitored wide background image by using a single video camera and tracking the object by controlling the panning, tilting and zooming functions of the video camera or PTZ camera.

2. Description of the Related Art

Video monitoring systems are used as a means for protecting an area or an unattended site from unauthorized intrusion. In these systems, a moving object is first detected in a monitored background image and then the target object is magnified and followed. The video image of the target moving object is recorded on a video cassette recorder for later analysis and identification. One example of the prior art video monitoring systems is described in Japanese Patent Publication 11-69342. In this system two video cameras are used, the first camera for detecting a motion in a monitored background image using a subtraction method and the second, PTZ camera for zooming in on and following the detected moving object using the position and size information of the motion obtained by the first camera. However, the use of two video cameras is costly and undesirable.

In Japanese Patent Publication 10-13821, a single video camera with a pan-and-tilt function and a subtraction method are used for initially detecting a motion in a monitored background image. Template matching then proceeds. In this process, the target image is stored in memory as a template and the camera is controlled so that difference between the current image and the template is reduced to a minimum. However, no zooming function is provided in this prior art.

SUMMARY OF THE INVENTION

It is therefore an object of the present invention to provide a method and system for following a detected fast moving object by making pan, tilt and zooming operations of a video camera.

A further object of the present invention is to provide a method and a system for using a single video camera for detecting a moving object and following the detected object by making pan, tilt and zooming operations of the single video camera.

Precision tracking is achieved by performing a motion compensation on a preceding frame to compensate for a movement of a background image of a detected moving object due to camera's tracking motion and estimating the position of the moving object based on the image difference between the motion-compensated frame and a succeeding frame.

According to a first aspect, the present invention provides a method of following a detected moving object using a video camera having panning, tilting and zooming functions, comprising the steps of (a) storing succeeding and preceding frames produced by the camera into first and second memories respectively and controlling the panning, tilting and zooming functions of the video camera according to a position and a size of the moving object, (b) performing a motion compensation on the preceding frame to compensate for a motion of a background image of the moving object so that coordinates of the preceding frame are transformed to coordinates of the succeeding frame, (c) detecting an image difference between the motion-compensated preceding frame and the succeeding frame and determining from the image difference a position and a size of the moving object, and (d) repeating the steps (a) to (c) by using the position and the size determined by the step (c) when the step (b) is repeated.

According to a second aspect, the present invention provides a method of following a detected moving object using a video camera having panning, tilting and zooming functions. The method comprises the steps of (a) producing a template representing a position and a size of the detected moving object, (b) storing succeeding and preceding frames produced by the camera into first and second memories respectively and controlling the panning, tilting and zooming functions of the video camera according to the stored position and size of the moving object, (c) selecting one of first, second and third tracking modes depending on a movement of the detected moving object. If the first tracking mode is selected, a motion compensation is performed on the preceding frame to compensate for a motion of a background image of the moving object so that coordinates of the preceding frame are transformed to coordinates of the succeeding frame, and an image difference between the motion-compensated frame and the succeeding frame is detected and a position and a size of the moving object are determined from the image difference, and the step (a) is repeated. If the second tracking mode is selected, the size of the template is transformed according to the zooming operation of the video camera caused by the step (b) as an updated size of the moving object, and a position of the moving object is detected that matches the transformed template, and the step (b) is repeated. If the third tracking mode is selected, the size of the template is transformed according to the zooming operation of the video camera caused by the step (b) as an updated size of the moving object, a motion compensation is performed on the preceding frame to compensate for a motion of a background image of the moving object so that coordinates of the preceding frame are transformed to coordinates of the succeeding frame, an image difference is detected between the motion-compensated frame and the succeeding frame, a position of the moving object is determined by using the transformed template and the image difference and the step (a) is repeated.

According to a third aspect of the present invention, there is provided an image tracking system comprising a video camera having panning, tilting and zooming functions, first and second memories for storing succeeding and preceding frames produced by the camera, respectively, tracking control circuitry connected to the video camera for detecting a moving object and performing a motion compensation on the preceding frame to compensate for a motion of a background image of a moving object so that coordinates of the preceding frame are transformed to coordinates of the succeeding frame, detecting an image difference between the motion-compensated frame and the succeeding frame, and determining from the image difference a position and a size of the moving object, and camera control circuitry for controlling the panning, tilting and zooming functions of the video camera according to the position and the size of the moving object.

According to a fourth aspect, the present invention provides an image tracking system for tracking a detected moving object, comprising:

a video camera having panning, tilting and zooming functions;

a template memory;

first and second memories for storing succeeding and preceding frames produced by the camera, respectively; and tracking control circuitry for performing the functions of:

a) storing a position and a size of the detected moving object as a template in the template memory;

b) controlling the panning, tilting and zooming functions of the video camera according to the stored position and size of the moving object;

c) selecting one of first, second and third tracking modes depending on a movement of the detected moving object;

d) if the first tracking mode is selected, performing a motion compensation on the preceding frame to compensate for a motion of a background image of the moving object so that coordinates of the preceding frame are transformed to coordinates of the succeeding frame;

e) detecting an image difference between the motion-compensated frame and the succeeding frame and determining from the image difference a position and a size of the moving object, and returning to the function (a);

f) if the second tracking mode is selected, transforming the size of the template according to the zooming operation of the video camera caused by the function (b) as an updated size of the moving object, and determining a position of the moving object that matches the transformed template, and returning to the function (b);

g) if the third tracking mode is selected, transforming the size of the template according to the zooming operation of the video camera caused by the function (b) as an updated size of the moving object;

h) performing a motion compensation on the preceding frame to compensate for a motion of a background image of the moving object so that coordinates of the preceding frame are transformed to coordinates of the succeeding frame; and i) detecting an image difference between the motion-compensated frame and the succeeding frame, determining a position of the moving object by using the transformed template and the image difference and returning to the function (a).

Preferably, the interval between the first and second frames is varied as a function of the size or speed of movement of the moving object.

BRIEF DESCRIPTION OF THE DRAWINGS

The present invention will be described in detail further with reference to the following drawings, in which.

DETAILED DESCRIPTION

Figure 1:
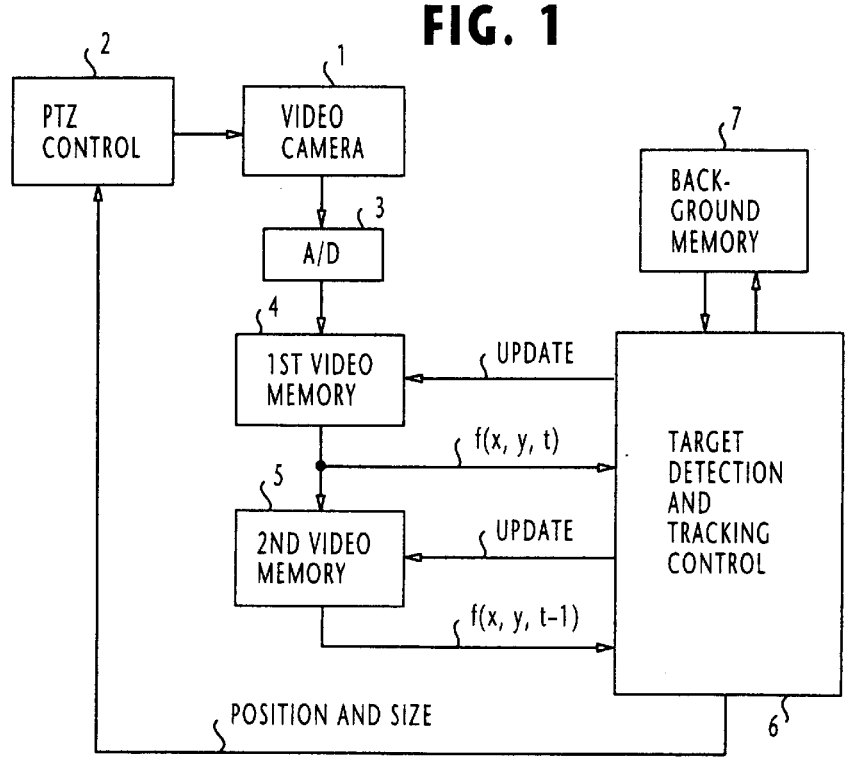
FIG. 1 is a block diagram of a motion tracking system according to the present invention.

Referring to FIG. 1, there is shown a moving object tracking system according to the present invention. The tracking system of is comprised of a video camera 1 which can pan, tilt and zoom in response to a control signal supplied from a PTZ controller 2. The system initially operates in a target detection mode and then in a tracking mode. In the target detection mode, the video camera 1 is in a normal position and produces frames of an identical scene of a monitored area at predetermined intervals and these frames are converted to digital signals in an A/D converter 3.

For detecting a moving object in the monitored area, the output of the A/D converter 3 of a given frame is stored in a first video memory 4. The given frame is then supplied to a taro detection and tracking controller 6 and stored in a background memory 7 as a background image when the video camera 1 produces a subsequent frame. Controller 6 updates the stored background image in order to incorporate changes in the lighting condition of the monitored area. When the controller 6 detects a moving object in the background image, the system enters a tracking mode.

During the tracking mode, the controller 6 controls the pan, tilt and zooming functions of the video camera 1 according to the position and the size of the detected target object and enables a second video memory 5 to store the output of the first video memory 4 as a preceding frame f(x, y, t−1) to allow the next frame to be stored in the first memory 4 as a succeeding frame f(x, y, t). Note that x and y are the x-axis and y-axis of the coordinate system of an image plane. Using the frames stored in the first and second video memories 4 and 5, the controller 6 performs an iterative gradient method to produce motion parameters for motion-compensating for the background image caused by the pan, tilt and zooming operations of the camera and updating the position and size of the moving object and further controls the pan, tilt and zooming functions of the video camera 1 according to the updated position and size of the target object.

Figure 2A:
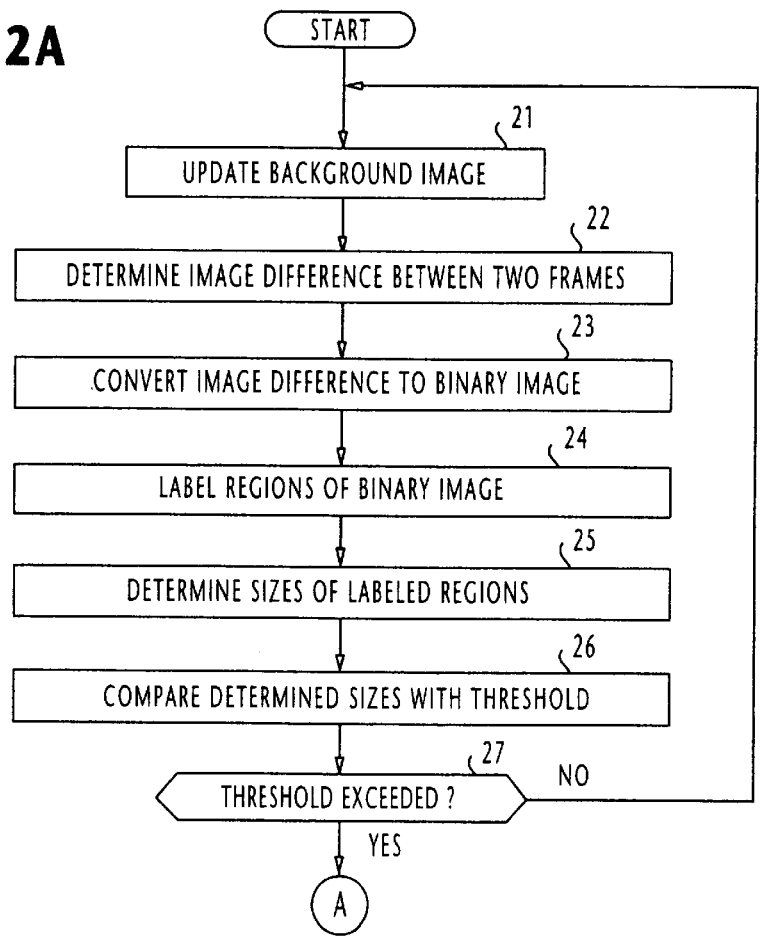
FIGS. 2A, 2B and 2C are flowcharts of the operation of the target detection and tracking controller of FIG. 1 according to a first embodiment of the present invention.
Figure 2B:
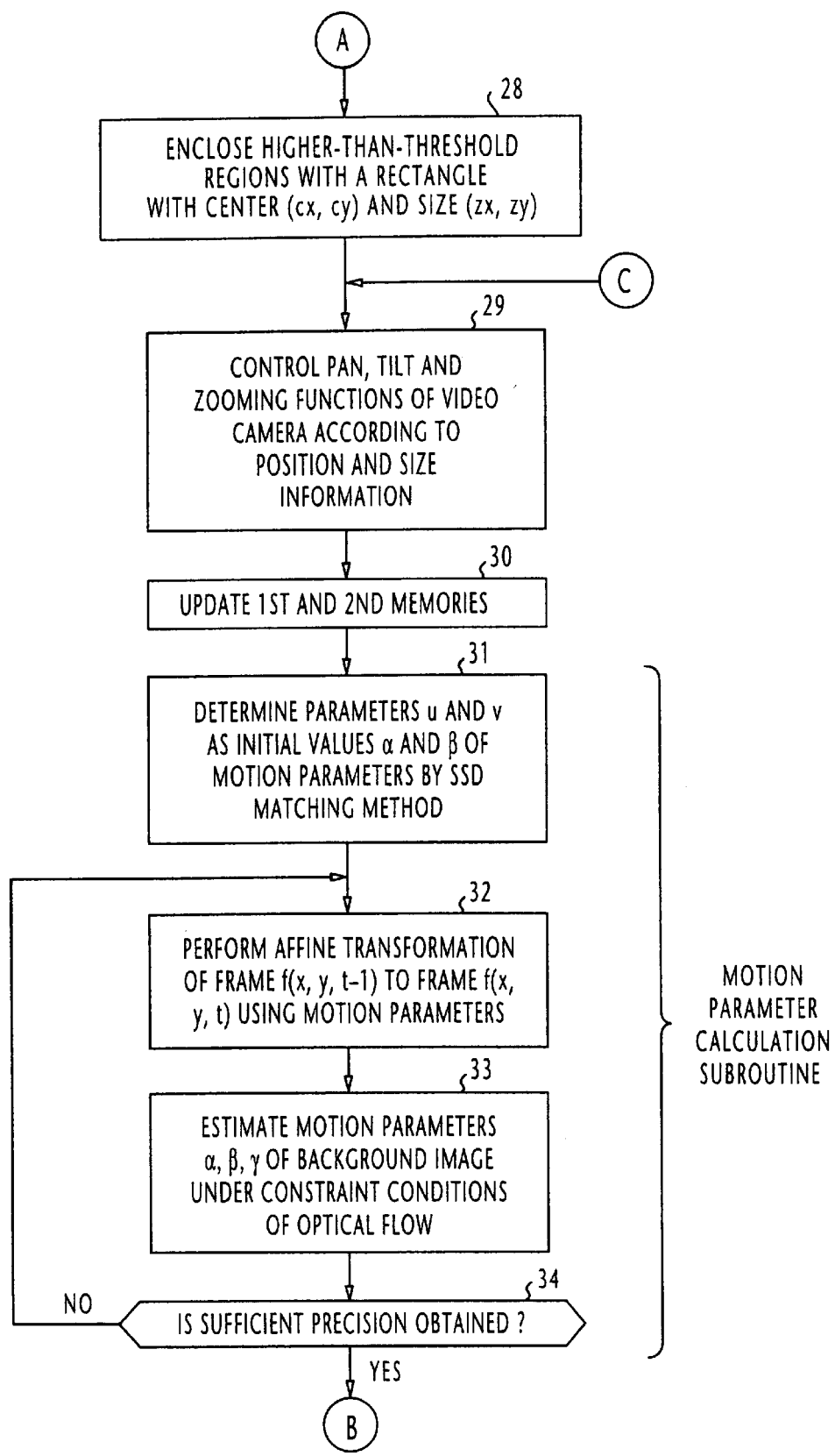
Figure 2C:
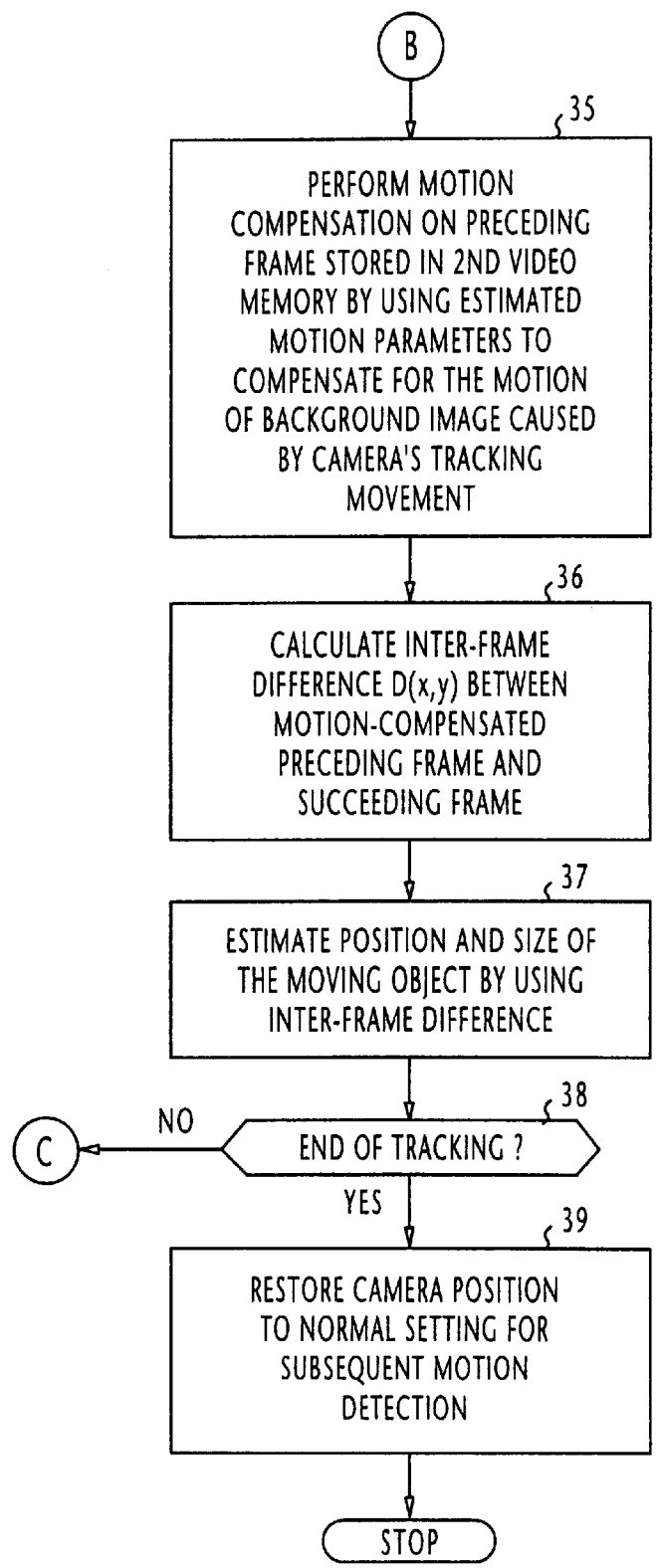

The following is a detailed description of the target detection and tracking controller 6 of a first embodiment of the present invention with the aid of the flowcharts of FIGS. 2A, 2B and 2C, In FIG. 2A, the controller 6 stores a given input frame f(x, y, t) into the background memory 7 as a background image B(x, y, t) and updates the stored image, at step 21, by solving the following recurrence formula:

$$B(x,y,t+1)=(1-k)B(x,y,t)+k \cdot f(x,y,t+1) \tag{1}$$

where, k is an update coefficient for determining the speed of background renewal.

At step 22, the controller 6 produces an image difference S(x, y, t) between a new frame f(x, y, t) in the first video memory 4 with the background image B(x, y, t) in the memory 7 as follows:

$$S(x,y,t)=|B(x,y,t)-f(x,y,t)| \tag{2}$$

Preferably, the Gaussian filtering technique may be used for smoothing the differential image. The differential image is then converted to a binary image at step 23. At step 24, each connective region in the binary image is labeled. At step 25, the controller 6 determines the size of each labeled image region and compares the size of each region with a threshold value (step 26). If there is none that exceeds the threshold value (step 27), it is determined that there is no moving object in He background image and the controller 6 returns to step 21 to continue the target detection mode.

If the threshold is exceeded at step 27, the controller 6 determines that there is a moving object in the background image. At step 28 (FIG. 2B), the controller 6 encloses the higher-than-threshold image components with left, right, upper and lower fences forming a minimum bounding rectangle, with its center position (cx, cy) and size (zx, zy) being located on the plane of he coordinates of the background image.

Controller 6 now operates in a tracking mode. At step 29, the pan, tilt and zooming functions of the video camera are controlled according to the coordinate position and size information (cx, cy) and (zx, zy) so that the video camera 1 is oriented to the best position with respect to the target moving object.

Figures 3, 4:
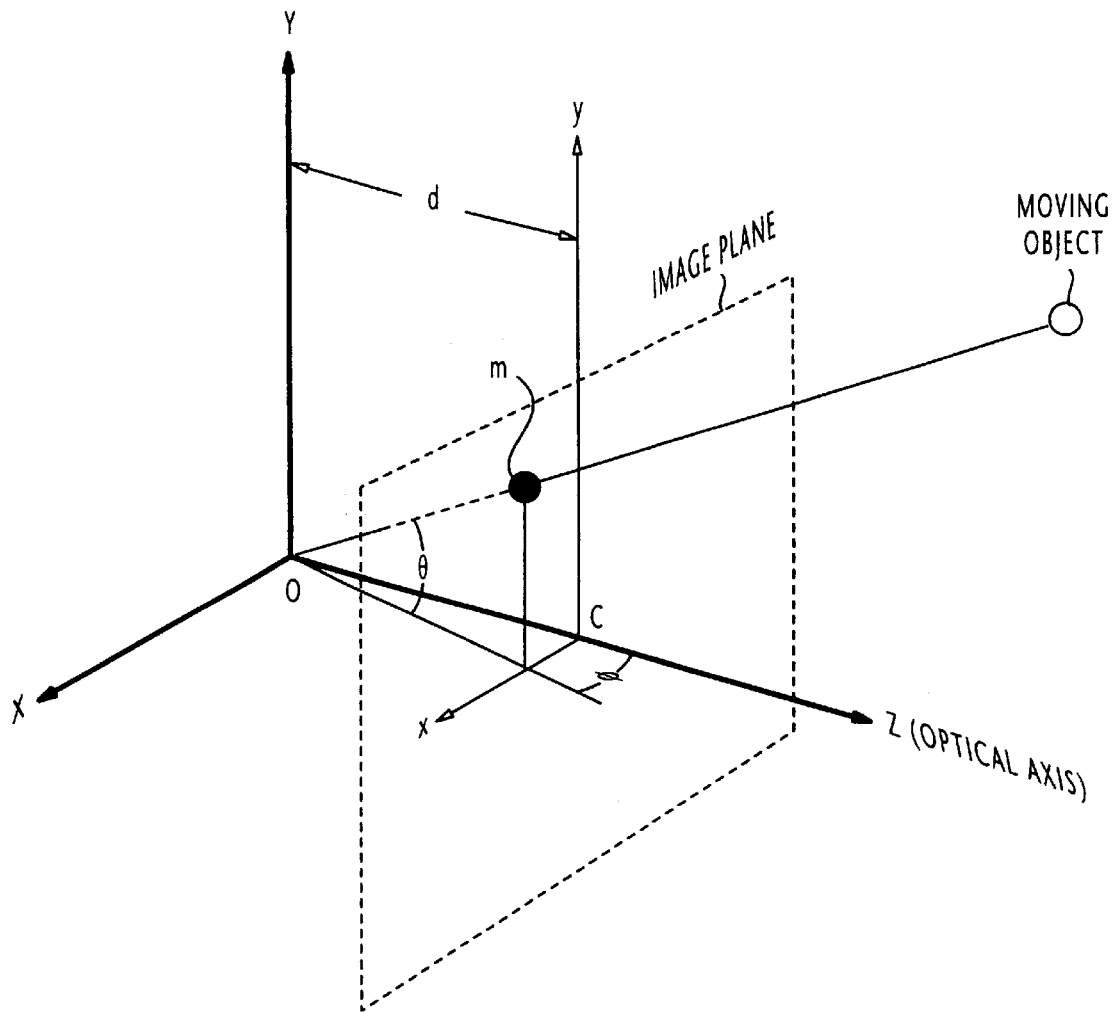
FIG. 3 is a graphical representation of an image plane on a three-dimensional coordinates of a video camera.
FIG. 4 is an illustration of a Gaussian kernel used in a Gaussian filtering process.

As shown in FIG. 3, the image plane of the video camera 1 has its center point "c" aligned with the origin "O" of the system of coordinates X, Y and Z of the monitored space and its optical axis aligned with the coordinate Z. The actual moving object in the monitored space is projected as an image object "m" onto an image plane which is located at the focal distance "d" of video camera 1. Video camera 1 is panned by an angle $\phi$ and tilted by an angle $\theta$ according to the position and size information so that the image object "m" is brought to the center point "c" of the image plane. The azimuth angle $\phi$ and the tilt angle $\theta$ are given by the following equations:

$$\phi = -cx/d \tag{3a}$$

$$\theta = -cy/d \tag{3b}$$

Controller 6 proceeds to step 30 to update the first and second video memories 4 and 5 so that the frame that occurred at the instant the moving object was detected is stored as a preceding frame f(x, y, t−1) in the second video memory 5 and the first frame that occurred at the instant the controller 6 entered the tracking mode is stored as a succeeding frame f(x, y, t) into the first video memory 4.

Controller 6 performs motion compensation to compensate for the movement of the background image caused by the tracking movement of the camera when step 29 is executed. Prior to the motion compensation, however, the controller 6 performs a motion parameter calculation subroutine for deriving initial values of motion parameters of the background image by assuming that the size of the target object is much smaller than the size of the background image.

The motion parameters can be estimated from the frames stored in the video memories 4 and 5 by assuming that the succeeding frame f(x, y, t) was subjected to affine transformation when the camera was panned, tilted and zoomed at step 29 and converted to the preceding frame f(x, y, t−1) under the following constraint condition:

$$f(x+u, y+v, t) = f(x, y, t-1) \tag{4}$$

where, $$u = \gamma \cdot x + \alpha$$

$$v = \gamma \cdot y + \beta$$

where, $\alpha$ and $\beta$ are displacements in the x and y directions, respectively, of the coordinate system of the image plane and $\gamma$ is a zooming coefficient representing the rate of expansion or contraction.

More specifically, at step 31, the controller 6 reads frames f(x, y, t−1) and f(x, y, t) from the memories 4 and 5 and estimates initial values of motion parameters $\alpha$ and $\beta$ of a background image according to the SSD (sum of squared differences) method by solving the following equation, assuming that the zooming coefficient $\gamma$ is zero:

$$J_1(u,v) = \Sigma |f(x+u, y+v, t) - f(x, y, t-1)|^2 \tag{5}$$

where the symbol $\Sigma$ represents a summation in the background region. A search is made through a space on a pixel-by-pixel basis for values u and v that minimize equation (5). The search may be conducted in a range from several pixels to several tens of pixels depending on the azimuth and tilt angles $\phi$ and $\theta$.

An iterative gradient method is used for estimating (updating) the motion parameters $\alpha$, $\beta$ and $\gamma$. At step 32, the values u and v obtained by step 31 are used as initial values of motion parameters $\alpha$ and $\beta$ to perform an affine transformation of the preceding frame f(x, y, t−1) to the succeeding frame f(x, y, t). At step 33, motion parameters $\alpha$, $\beta$ and $\gamma$ of the background image are estimated under the constraint conditions of optical flow. This is achieved by minimizing the following objective function $J_2(\alpha, \beta, \gamma)$:

$$J_2(\alpha, \beta, \gamma) = \Sigma |f(x+u, y+v, t) - f(x, y, t-1)|^2 \tag{6}$$

By performing a Taylor expansion on f(x+u, y+v, t) about f(x, y, t−1), the objective function $J_2$ can be approximated as:

$$J_2(\alpha, \beta, \gamma) \approx \Sigma |u \partial f/\partial x + v \partial f/\partial y + \partial f/\partial t|^2 \tag{7}$$

The conditions that yield a minimum value for $J_2(\alpha, \beta, \gamma)$ are given by the following relations:

$$\partial J_2(\alpha, \beta, \gamma)/\partial \alpha = 0 \tag{8a}$$

$$\partial J_2(\alpha, \beta, \gamma)/\partial \beta = 0 \tag{8b}$$

$$\partial J_2(\alpha, \beta, \gamma)/\partial \gamma = 0 \tag{8c}$$

Substituting u and v of equation (4) and $J_2(\alpha, \beta, \gamma)$ of equation (7) into equations (8a, 8b, 8c) results in the following transpose matrix:

$$^T(\alpha, \beta, \gamma) = -A^{-1}B \tag{9}$$

where, $$A = \Sigma\,^T W\,W$$

$$B = \Sigma(\partial f/\partial t\,^T W).$$

where, $A^{-1}$ represents an inverse of matrix A and the symbol $\Sigma$ represents a summation in the background region, and $^T W$ is a transpose of matrix ($\partial f/\partial x$, $\partial f/\partial y$, $x\partial f/\partial y + y\partial f/\partial y$). By solving the transpose matrix of equation (9), motion parameters $\alpha$, $\beta$ and $\gamma$ are obtained. The partial derivatives of equations (8a, 8b, 8c) are obtained by using the horizontal differential components (f(x+1, y, t)−f(x−1, y, t))/2 and the vertical differential components (f(x, y+1, t)−f(x, y−1, t))/2. The temporal partial derivative $\partial f/\partial t$ is obtained from the inter-frame difference. For further information on affine transformation, see "Two-Dimensional Imaging", Ronald N. Bracewell, Prentice Hall, pages 56 to 61.

Since Taylor expansion is used in equation (7), the degree of precision is not satisfactory in cases where the amount of displacement is relatively large. In a practical aspect, the precision of sub-pixel level is required for parameters $\alpha$ and $\beta$. For this reason, if a sufficient degree of precision is not obtained (step 34), steps 32 and 33 are repeatedly executed by using the estimated motion parameters $\alpha$, $\beta$ and $\gamma$.

If the decision at step 34 is affirmative, the controller 6 proceeds to step 35 (FIG. 2C) to perform a motion compensation on the preceding frame of the second video memory 5 using the estimated motion parameters $\alpha$, $\beta$ and $\gamma$. More specifically, the motion of the background image caused by the tracking movement of the video camera at step 29 is compensated for by subjecting the frame of the second video memory to an affine transformation such as bilinear interpolation so that the x-y coordinates of the preceding frame are transformed to the x-y coordinates of the succeeding frame.

Controller 6 proceeds to step 36 to calculate the inter-frame difference $D(x, y)$ between the motion-compensated preceding frame $f'(x, y, t-1)$ and the succeeding frame $f(x, y, t)$. The Gaussian filtering technique is then used to eliminate noise components caused by undesired misalignment between the two frames by performing a convolution as follows:

$$D(x,y)=G^*|G^*f(x,y,t)-G^*f'(x,y,t-1)| \quad (10)$$

where G represents the Gaussian filter and * represents convolution. FIG. 4 shows a 5×5 Gaussian kernel which is used in the Gaussian filtering process.

At step 37, the position and size of the moving object are estimated by using the inter-frame image difference $D(x,y)$. Specifically, the position of the moving object is estimated as being equal to a sum of its previous position and the displacements of the video camera and the moving object. First, the center position (cx, cy) of the moving object is determined by:

$$cx = \Sigma x D(x,y)/\Sigma D(x,y) \quad (11a)$$

$$cy = \Sigma y D(x,y)/\Sigma D(x,y) \quad (11b)$$

where the symbol $\Sigma$ represents the summation within the moving object. The size of the moving object is then estimated by moving its four-side fences (left, right, upper and lower) by amounts corresponding to the inter-frame difference $D(x, y)$. For example, the left-side fence of the moving object is moved by first solving the following fence value:

$$S_{left}(x) = \left(\sum_{ymin}^{ymax} D(x,y)\right) / (ymax - ymin) \quad (12)$$

where, ymax and ymin are the upper and lower limits of the left-side fence. Starting with a pixel point on the outer side of the left-side fence, a decision is made as to whether the fence value $S_{left}(x)$ of that pixel point is greater than a threshold value $\delta$ which is given by:

$$\delta = k_1 \sqrt{\text{decision area}} + k_2 \quad (13)$$

where $k_1$ and $k_2$ are constants

If the decision indicates that the fence value of that pixel point is greater than the threshold $\delta$, the left-side fence is moved to that pixel point. If all values of the left-side fence within the decision area are smaller than the threshold value $\delta$, then the left-side fence of the moving object is moved to the left side of the decision area. The moving object is restricted within the range between a predetermined minimum size and a predetermined maximum size. The above process is repeated for the right-side fence, the upper-side fence and the lower-side fence.

At decision step 38, the controller 6 determines whether the moving object has moved outside of the monitored area for a predetermined period. If the decision is negative, the controller 6 returns to step 29 to repeat the tracking mode. If the decision at step 38 is affirmative, the controller proceeds to step 39 to restore the camera 1 to the normal position and terminate the routine.

For precision tracking it is desirable to adaptively control the number of frame intervals that exist between the frames (between which the motion compensation is performed at step 35) as a function of the size or velocity of the target object (enclosed within a minimum rectangle).

For example, if the size of a moving object is used for this purpose, the preceding frame of interest is given as follows:

1) The preceding frame is four-frame prior to the succeeding frame of interest if the size of the moving object is equal to or smaller than 32×32 pixels.

2) The preceding frame is three-frame prior to the succeeding frame if the size of the moving object is greater than 32×32 pixels but equal to or smaller than 48×48 pixels.

3) The preceding frame is two-frame prior to the succeeding frame if the size of the moving object is greater than 48×48 pixels but equal to or smaller than 64×64 pixels.

4) The preceding frame is one-frame prior to the succeeding frame if the size of the moving object is greater than 64×64 pixels.

If the velocity of a moving object is used for controlling the number of such intervening frames, the positions of successive frames are first determined (while eliminating those components caused by the movement of the camera 1) and then the difference between these positions is calculated as a velocity of the moving object. A preceding frame that is n-frame prior to the current frame is determined inversely as a function of the detected velocity and the determined preceding frame is motion-compensated by using affine transformation parameters. These affine transformation parameters are obtained as follows;

$$A_t = (1+\gamma_t)E \quad (14a)$$

$$b_t = ^T(\alpha_t,\beta_t) \quad (14b)$$

where, E denotes a 2×2 unit matrix which can be obtained by:

$$<A_n> = A_t A_{t-1} \ldots A_{t-(-1)} = ((1\gamma_{t-1})(1+\gamma_t) \ldots (1+\gamma_{t-(n-1)}((E=(\Pi(1+\gamma_t))E \quad (15a)$$

$$<b_n> = A_t A_{t-1} \ldots A_{t-(n-2)} b_{t-}(n-1) + \ldots + A_t b_{t-1} + b_t \quad (15b)$$

Figure 5:
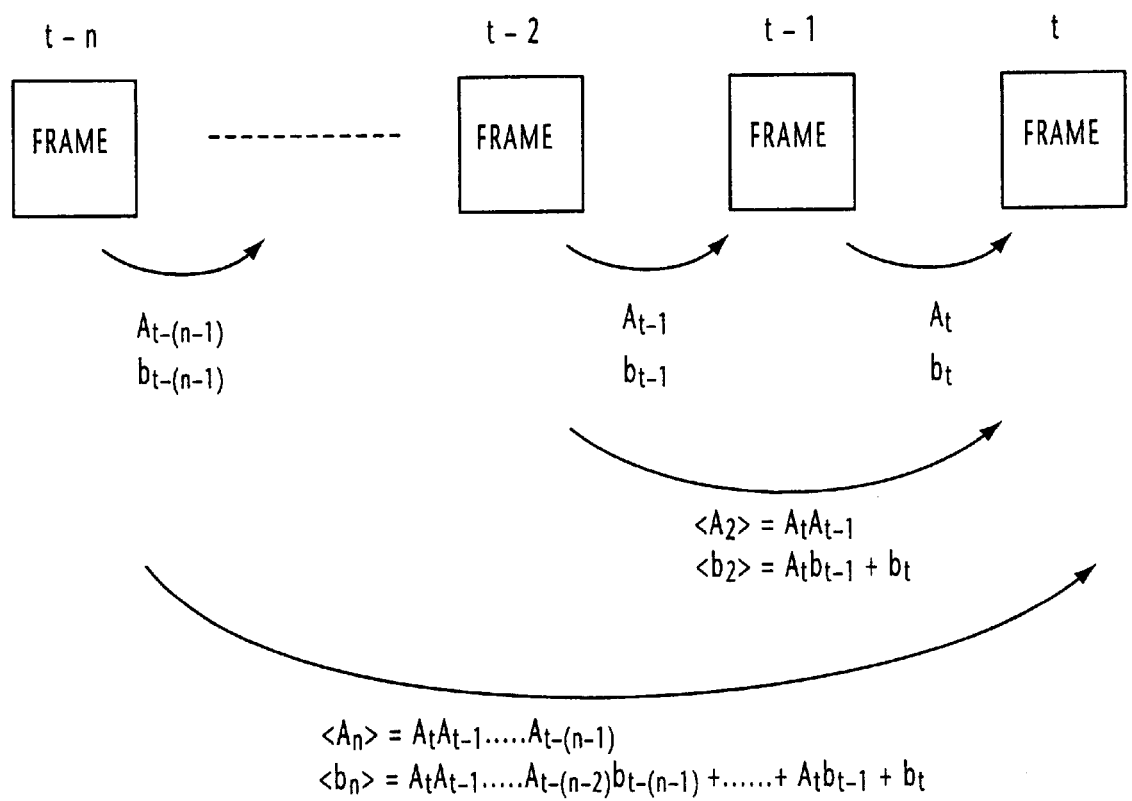
FIG. 5 is a schematic illustration useful for describing the process of determining frames according to the velocity of a moving object.

The preceding frames "n" and the associated matrices are shown in FIG. 5.

The embodiment shown in FIGS. 2A to 2C can be characterized as an inter-frame subtraction mode which is best suited for tracking objects whose speed of movement is relatively high and constant. However, the inter-frame subtraction mode is not always appropriate. Target objects may have a slow motion in some instances and a quick, jerky movement at other times.

A second embodiment of the present invention is provided for applications where target objects move in varying modes. Target detection and tracking controller 6 of the second embodiment includes a template memory for storing the video image of a detected target object as a template to provide matching with subsequent images of the target object. This mode of operation, termed a template matching mode, is best suited for such target objects whose speed of movement is slow. For moving objects whose speed of movement is intermediate between high and low speeds, a hybrid mode of operation is suitable. In this hybrid mode the inter-frame subtraction mode and the template mating mode are combined. Since moving objects are not always moving at a constant speed, they cannot be permanently categorized into one of such three modes of operation. Instead their movements vary with time as a combination of the different modes.

Figure 6:
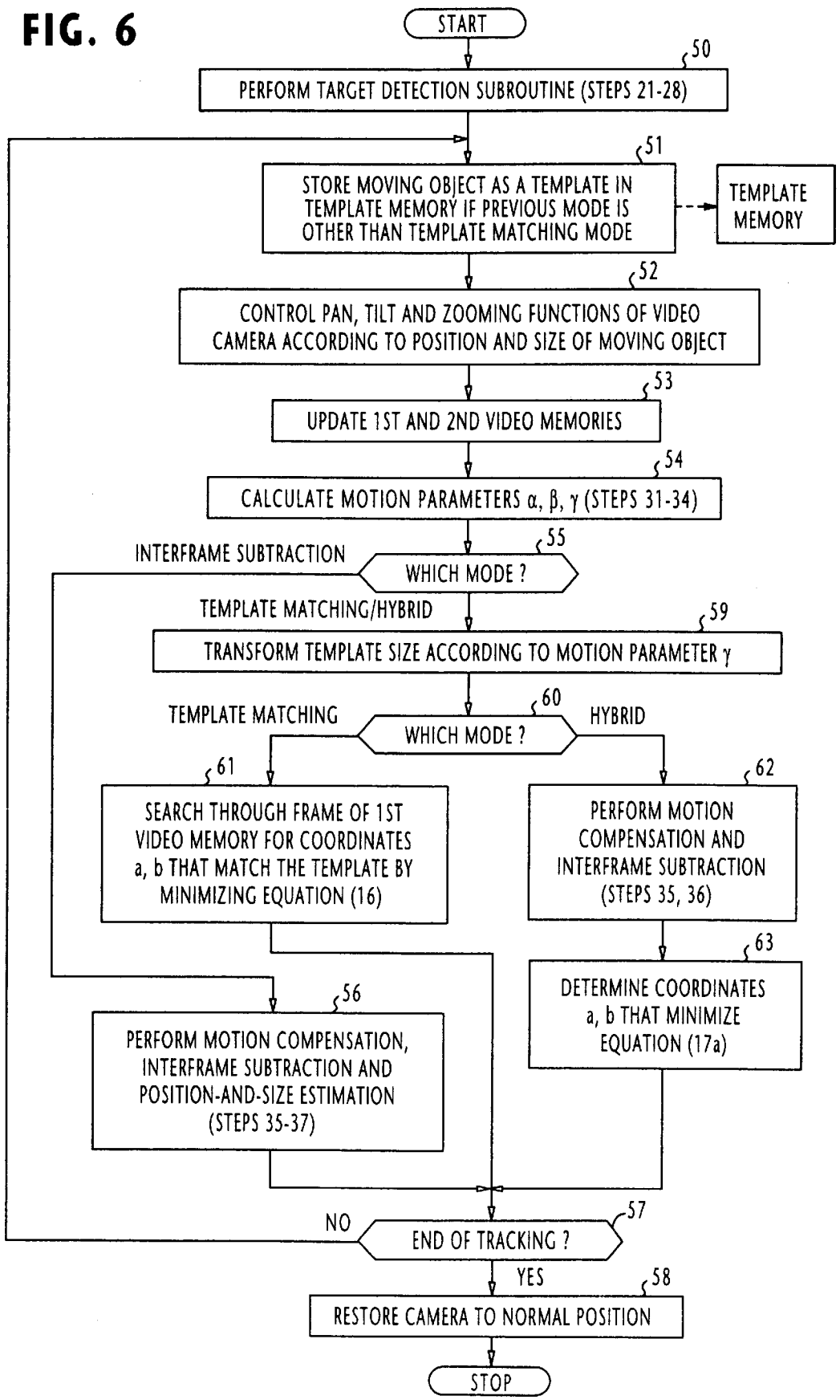
FIG. 6 is a flowchart of the operation of the target detection and tracking controller according to a second embodiment of the present invention.

FIG. 6 is a flowchart of the operation of the controller 6 according to the second embodiment of the present invention. Initially, the controller 6 performs a target detection subroutine 50, which corresponds to steps 21 to 28 of FIGS. 2A and 2B as discussed in the previous embodiment, to detect a moving object and then determine the position and size of the detected object. If a moving object is detected in subroutine 50, the controller 6 proceeds to step 51 to store the detected target object as a template into a template memory according to its position and size if the previous mode of operation is other than template matching mode.

At step 52, the pan, tilt and zooming functions of video camera 1 are controlled according to the position and size of the moving object. Video memories 4 and 5 are updated with most recent successive frames (step 53).

Next, the controller 6 proceeds to motion-parameter estimation subroutine 54 in which it performs steps 31 to 34 (FIG. 2B) to calculate motion parameters $\alpha$, $\beta$, $\gamma$ according to the iterative gradient method.

Controller 6 proceeds to decision step 55 to determine which tracking mode is appropriate for following the detected target object. If the target object is moving smoothly at a relatively high speed, the controller 6 determines that the inter-frame subtraction mode is suitable and proceeds to inter-frame subtraction subroutine 56 in which the controller executes steps 35 to 37 of FIGS. 2B and 2C to perform a motion compensation on the preceding frame stored in the second memory 5, an inter-frame subtraction to produce an image difference between the motion-compensated frame and the succeeding frame and a position-and-size estimation based on the image difference. Next step 57 determines whether the tracking mode should proceed further. If so, the decision at step 57 is negative and the controller returns to step 51. If the decision at step 57 is affirmative, flow proceeds to step 58 to restore the camera position to normal and terminates the program routine.

Figure 7:
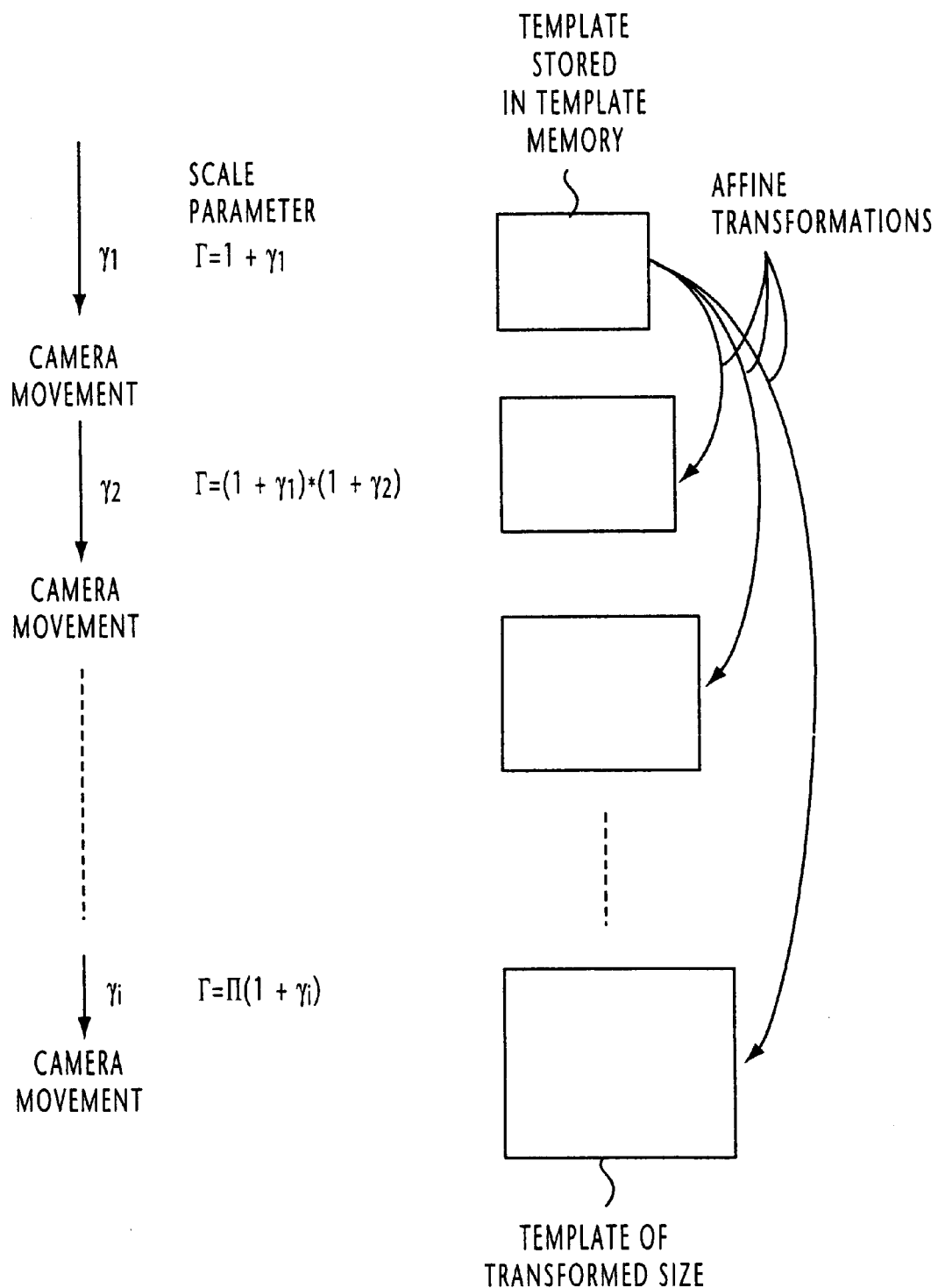
FIG. 7 is a schematic illustration useful for describing a process of updating the size of a template when template matching is used in a tracking mode.

If the detected moving object is either a slow moving or jerky moving object, step 55 will select the template matching/hybrid mode and the controller 6 proceeds to step 59 to transform the size of the stored template according to motion parameter $\gamma$, as shown in FIG. 7, by using a scale parameter $\Gamma=\Pi(1+\gamma_i)$ so that the transformed template is appropriate for tracking the moving object.

Controller 6 proceeds to step 60 to determine if template matching mode or hybrid mode is currently selected. If the current tracking mode is template matching, flow proceeds from step 60 to step 61 to perform an SAD (sum of absolute differences) matching process by making a search through the frame of the first video memory 4 for an optimum position (a, b) that matches the template T(x, y). This is achieved by minimizing the following equation (16):

$$J_{SAD}(a,b)=\Sigma|f(x+a,y+b,t)-T(x,y)| \quad (16)$$

where, a and b are coordinate positions of image on the template, and $\Sigma$ is the subornation on the template. The position of the moving object determined in this manner will be used to further control the video camera (step 52) if the controller 6 determines, at step 57, that the template matching mode should continue. If this is the case, the controller 6 returns to step 51 to continue the tracking mode. The tracking mode determined at step 55 of a given sequence is used as a previous mode in the next sequence. When step 51 is repeated after a given cycle of template matching mode, the template memory is not updated, and the position of the template determined at step 61 and its size transformed at step 59 are used by subsequent step 52 to control the pan, tilt and zooming functions of the video camera. Steps 53, 54 and 55 are repeated to determine the next tracking mode again.

Returning to step 60, if the controller 6 determines that hybrid mode is the current mode, subroutine 62 is executed by performing a motion compensation on the preceding frame in the second memory 5 and an inter-frame subtraction to extract an image difference $D(x, y)=|f(x, y, t)-f(x, y, t-1)|$ between the motion-compensated frame and the succeeding frame of the first memory 4 in the same manner as steps 35 and 36 (FIG. 2C).

At step 63, the controller 6 determines the x-y coordinates (a, b) of the moving object that minimize the following equation (17a) which is a linear sum of the SAD value as used in the template matching mode and the inter-frame difference D(x, y) as used in the inter-frame subtraction mode:

$$J_{hybrid}(a,b)=k_{SAD}J_{SAD}(a,b)+k_m J_m(a,b) \quad (17a)$$

$$J_{SAD}(a,b)=\Sigma|f(x+a,y+b,t)-T(x,y)| \quad (17b)$$

$$J_m(a,b)=\Sigma\{D(x,y)(x-a)^2+D(x,y)(y-b)^2\} \quad (17c)$$

where $k_{SAD}$ and $k_m$ are weight coefficients.

The position of the moving object determined in is manner and the size transformed at step 59 will be used to control the video camera if the controller determines, at step 57, that the hybrid tracking mode should continue. If this is the case, the controller 6 returns to step 51 to update the template memory with the position data obtained at step 63 and the size of the template transformed at step 59 and proceeds to step 52 to control the pan, tilt and zooming functions of the video camera according to the position and size data stored in the template memory, and then repeat the process that follows.

Therefore, the template is not updated at step 51 as long as the template matching mode is repeated in order to use the same template. However, the template is updated for a new sequence of template matching in the event the tracking mode changes from other modes as the program routine is repeatedly processed.

What is claimed is:

1. A method of following a detected moving object using a video camera having panning, tilting and/or zooming functions, comprising the steps of:

a) storing succeeding and preceding frames produced by said camera into first and second memories, respectively, and controlling the panning, tilting and/or zooming functions of said video camera according to a position and a size of said moving object;

b) performing a motion compensation on said preceding frame to compensate for a motion of a background image of said moving object so that coordinates of said preceding frame are transformed to coordinates of the succeeding frame;

c) detecting an image difference between the motion-compensated preceding frame and said succeeding frame and determining from the image difference a position and a size of the moving object; and d) repeating steps (a) to (c) by using said position and said size of step (c) when the step (b) is repeated.

2. The method of claim 1, further comprising the steps of detecting a moving object by subtraction between successive frames produced by said video camera and determining a position and a size of the moving object as the position and the size of step (a).

3. The method of claim 1, wherein step (b) comprises the steps of ($b_1$) calculating motion parameters according to an iterative gradient method under constrained optical flow and ($b_2$) performing said motion compensation according to the motion parameters.

4. The method of claim 3, wherein step ($b_1$) comprises the steps of:
   determining initial values of motion parameters by using an SSD (sum of squared differences) matching method;
   performing an affine transformation of the preceding frame to the succeeding frame by using said initial values of motion parameters;
   estimating said motion parameters of background image by using the affine-transformed preceding frame under constraint conditions of optical flow; and
   repeating the affine transformation and the estimation of the motion parameters until said motion parameters have a sufficient degree of precision.

5. The method of claim 1, wherein a time interval between the motion-compensated frame and said succeeding frame of step (c) is adaptively varied according to the size of said moving object.

6. The method of claim 1, wherein a time interval between the motion-compensated frame and said succeeding frame of step (c) is adaptively varied according to a speed of movement of said moving object.

7. A method of following a detected moving object using a video camera having panning, tilting and zooming functions, comprising the steps of:
   a) producing a template representing the detected moving object;
   b) storing succeeding and preceding frames produced by said camera into first and second memories, respectively, and controlling the panning, tilting an zooming functions of said video camera according to a position and a size of the moving object;
   c) selecting one of first, second and third tracking modes depending on a movement of the detected moving object;
   d) if said first tracking mode is selected, performing a motion compensation on said preceding frame to compensate for a motion of a background image of said moving object so that coordinates of said preceding frame are transformed to coordinates of the succeeding frame;
   e) detecting an image difference between the motion-compensated frame and said succeeding frame and determining from the image difference a position and a size of the moving object, and returning to step (a);
   f) if said second tracking mode is selected, transforming the size of the template as an updated size of the moving object according to a zooming operation of said video camera caused by step (b), and determining a position of said moving object that matches the transformed template, and returning to step (b);
   g) if said third tracking mode is selected, transforming the size of the template as an updated size of the moving object according to a zooming operation of said video camera caused by step (a);

h) performing a motion compensation on the preceding frame to compensate for a motion of a background image of said moving object so that coordinates of said preceding frame are transformed to coordinates of the succeeding frame; and i) detecting an image difference between the motion-compensated frame and said succeeding frame, determining a position of the moving object by using the transformed template and the image difference and returning to step (a).

8. The method of claim 7, further comprising the steps of detecting a moving object by subtraction between successive frames produced by said video camera and determining a position and a size of the moving object as the position and the size of step (b).

9. The method of claim 7, wherein each of steps (d) and (h) comprises the steps of calculating motion parameters according to an iterative gradient method under constrained optical flow and performing said motion compensation according to the motion parameters.

10. The method of claim 9, wherein the step of motion parameter calculation comprises the steps of:
    determining initial values of motion parameters by using an SSD (sum of squared differences) matching method;
    performing an affine transformation of the preceding frame to the succeeding frame by using said initial values of motion parameters;
    estimating said motion parameters of background image by using the affine-transformed preceding frame under constraint conditions of optical flow; and
    repeating the affine transformation and the estimation of the motion parameters until said motion parameters have a sufficient degree of precision.

11. The method of claim 7, wherein a time interval between the motion-compensated frame and said succeeding frame of step (e) is adaptively varied according to the size of said moving object.

12. The method of claim 7, wherein a time interval between the motion-compensated frame and said succeeding frame of the step (e) is adaptively varied according to a speed of movement of said moving object.

13. The method of claim 7, wherein step (f) comprises the step of determining said position of said moving object by using an SAD (sum of absolute differences) matching method.

14. The method of claim 7, wherein step (i) comprises the step of determining said position of the moving object by using a linear sum of an SAD (sum of absolute differences) matching value and said image difference.

15. An image tracking system for tracking a detected moving object, comprising:
    a video camera having panning, tilting and/or zooming functions;
    first and second memories for storing succeeding and preceding frames produced by said camera, respectively;
    tracking control circuitry connected to the video camera for performing a motion compensation on the preceding frame to compensate for a motion of a background image of the detected moving object so that coordinates of said preceding frame are transformed to coordinates of the succeeding frame, detecting an image difference between the motion-compensated frame and the succeeding frame, and determining from the image difference a position and a size of the moving object; and
    camera control circuitry for controlling the panning, tilting and/or zooming functions of said video camera according to said position and said size of e moving object.

16. The image tracking system of claim 15, wherein said tracking control circuitry is configured to detect a moving object by subtraction between successive frames produced by said video camera and determine initial values of said position and said size of the moving object.

17. The image tracking system of claim 15, wherein said tracking control circuitry is configured to use an iterative gradient method under constrained optical flow to determine motion parameters and perform said motion compensation according to the determined motion parameters.

18. The image tracking system of claim 15, wherein said tracking control circuiting is configured to perform said motion compensation by calculating motion parameters according to an iterative gradient method under constrained optical flow and performing said motion compensation according to the motion parameters.

19. The image tracking system of claim 18, wherein said calculating motion parameters comprises:

determining initial values of motion parameters by using an SSD (sum of squared differences) matching method;

performing an affine transformation of the preceding frame to the succeeding frame by using said initial values of motion parameters;

estimating said motion parameters of background image by using the affine-transformed preceding frame under constraint conditions of optical flow; and repeating the affine transformation and the estimation of the motion parameters until said motion parameters have a sufficient degree of precision.

20. The image tracking system of claim 15, wherein a time interval between the motion-compensated frame and said succeeding frame is adaptively varied according to the size of said moving object.

21. The image tracking system of claim 15, wherein a time interval between the motion-compensated frame and said succeeding frame is adaptively varied according to a speed of movement of said moving object.

22. An image tracking system for tracking a detected moving object, comprising:

a video camera having panning, tilting and zooming functions;

a template memory;

first and second memories for storing succeeding and preceding frames produced by said camera, respectively; and tracking control circuitry for performing the functions of:

a) storing the detected moving object as a template in said template memory;

b) controlling the panning, tilting and zooming functions of said video camera according to a position and a size of the moving object;

c) selecting one of first, second and third tracking modes depending on a movement of the detected moving object;

d) if said first tracking mode is selected, performing a motion compensation on said preceding frame to compensate for a motion of a background image of said moving object so that coordinates of said preceding frame are transformed to coordinates of the succeeding frame;

e) detecting an image difference between the motion-compensated frame and said succeeding frame and determining from the image difference a position and a size of the moving object, and returning to the function (a);

f) if said second tracking mode is selected, transforming the size of the template as an updated size of the moving object according to the zooming operation of said video camera caused by the function (b), and determining a position of said moving object that matches the transformed template, and returning to the function (b);

g) if said third tracking mode is selected, transforming the size of the template as an updated size of the moving object according to a zooming operation of said video camera caused by the function (b);

h) performing a motion compensation on the preceding frame to compensate for a motion of a background image of said moving object so that coordinates of said preceding frame are transformed to coordinates of the succeeding frame; and i) detecting an image difference between the motion-compensated frame and said succeeding frame, determining a position of the moving object by using the transformed template and the image difference and returning to the function (a).

23. The image tracking system of claim 22, wherein said tracking control circuitry is configured to detect a moving object by subtraction between successive frames produced by said video camera and determine a position and a size of the moving object as the position and the size of the function (b).

24. The image tracking system of claim 22, wherein said tracking control circuitry is configured to use an iterative gradient method under constrained optical flow to determine motion parameters and perform said motion compensation according to the determined motion parameters.

25. The image tracking system of claim 22, wherein each of the functions (d) and (h) comprises the functions of calculating motion parameters according to an iterative gradient method under constrained optical flow and performing said motion compensation according to the motion parameters.

26. The image tracking system of claim 25, wherein the function of motion parameter calculation comprises the steps of:

determining initial values of motion parameters by using an SSD (sum of squared differences) matching method;

performing an affine transformation of the preceding frame to the succeeding frame by using said initial values of motion parameters;

estimating said motion parameters of background image by using the affine-transformed preceding frame under constraint conditions of optical flow; and repeating the affine transformation and the estimation of the motion parameters until said motion parameters have a sufficient degree of precision.

27. The image tracking system of claim 22, wherein a time interval between the motion-compensated frame and said succeeding frame is adaptively varied according to the size of said moving object.

28. The image tracking system of claim 22, wherein a time interval between the motion-compensated frame and said succeeding frame is adaptively varied according to a speed of movement of said moving object.

29. The image tracking system of claim 22, wherein the function (f) comprises determining said position of said moving object by using an SAD (sum of absolute differences) matching method.

30. The image tracking system of claim 22, wherein the function (i) comprises determining said position of the moving object by using a liner sum of an SAD (sum of absolute differences) matching value and said image difference.

* * * * *